(12) United States Patent
Hwang et al.

(10) Patent No.: US 10,105,853 B1
(45) Date of Patent: Oct. 23, 2018

(54) FLEXIBLE ROBOT END-EFFECTOR FOR ASSEMBLING DOOR CLOSURE

(71) Applicant: GM Global Technology Operations LLC, Detroit, MI (US)

(72) Inventors: Dooil Hwang, Rochester Hills, MI (US); Jinglin Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/726,089

(22) Filed: Oct. 5, 2017

(51) Int. Cl.
*B25J 15/02* (2006.01)
*B25J 9/10* (2006.01)
*B25J 15/00* (2006.01)

(52) U.S. Cl.
CPC ......... *B25J 15/0052* (2013.01); *B25J 9/1005* (2013.01); *B25J 15/0061* (2013.01); *B25J 15/0206* (2013.01)

(58) Field of Classification Search
CPC .............. B25J 15/0052; B25J 15/0061; B25J 15/0206; B25J 9/1005
USPC ............................ 294/81.2, 81.61, 86.4, 197
See application file for complete search history.

(56) References Cited

U.S. PATENT DOCUMENTS

| | | | | |
|---|---|---|---|---|
| 4,765,668 A * | 8/1988 | Slocum | ............... | B25J 15/0052 294/119.1 |
| 5,184,861 A * | 2/1993 | Voellmer | ............... | B25J 15/026 294/119.1 |
| 6,439,631 B1 * | 8/2002 | Kress | ................... | B65G 47/918 294/65 |
| 6,802,499 B2 * | 10/2004 | Grosso | ..................... | B23Q 3/18 269/152 |
| 7,100,955 B2 * | 9/2006 | Nakamura | ........... | B25J 15/0052 294/188 |
| 7,611,180 B1 * | 11/2009 | Fisher | .................. | B25J 15/0052 294/65 |
| 8,256,811 B2 * | 9/2012 | Yeum | ................... | B25J 15/0061 269/905 |
| 8,408,616 B2 * | 4/2013 | Yeum | ................... | B25J 15/0061 294/197 |
| 8,485,575 B2 * | 7/2013 | Yeum | ................... | B25J 15/0052 269/905 |
| 2009/0194922 A1 * | 8/2009 | Lin | ...................... | B25J 15/0052 269/55 |
| 2013/0113148 A1 * | 5/2013 | Jang | ....................... | B62D 65/18 269/58 |
| 2013/0113149 A1 * | 5/2013 | Yeum | ................ | B23K 37/0443 269/59 |

(Continued)

*Primary Examiner* — Dean J Kramer
(74) *Attorney, Agent, or Firm* — Quinn IP Law (57) ABSTRACT

A flexible end-effector for a robot includes a frame and a clamp assembly movably coupled to the frame. As such, the clamp assembly is movable relative to the frame along a first direction, wherein the clamp assembly includes a locator and a clamp movably coupled to the locator. The clamp assembly also includes pneumatic actuator coupled to the clamp to move the clamp between an open position and a closed position. The flexible end-effector further includes linear motion slides coupled between the clamp assembly and the frame to allow the clamp assembly to move linearly relative to the frame along the first direction. Further, the flexible end-effector includes a servomotor assembly coupled to the linear motion slide to actuate the linear motion slide. The servomotor assembly includes a servomotor and a motor controller integrated with the servomotor.

8 Claims, 7 Drawing Sheets

(56) References Cited

U.S. PATENT DOCUMENTS

2017/0050323 A1* 2/2017 Shi ...................... B25J 15/0047

* cited by examiner

FLEXIBLE ROBOT END-EFFECTOR FOR ASSEMBLING DOOR CLOSURE

INTRODUCTION

The present disclosure generally relates to robotic systems. In particular, the present disclosure relates to a flexible end-effector of a robotic system for assembling door closures.

Multi-axis industrial robots include articulated arms connected via a shoulder joint. Each segment is driven via one or more joint motors. Typical industrial robots are controlled with respect to six different control axes. Collectively, the control axes enable rotation of the robot with respect to a fixed or mobile base, extension/retraction of a first arm, and raising/lowering of a second arm, as well as shoulder joint rotation and rotation/translation of a wrist disposed at a distal end of the second arm. Additional arms may be used in a serial arrangement depending on the design, and an end-effector connected to the wrist may be manipulated to perform a desired work task.

The term "end-effector" refers to the particular end linkages or segments that, depending on the design of the robot, can securely grip, transport, orient, and release a work piece. Certain end-effector assemblies are formed via a latticed array of elongated beams and rails to which are attached a set of tool branches suspended with tool modules, e.g., suction cups or grippers of the type used for moving metal panels or panes of glass in a manufacturing facility.

SUMMARY

The present disclosure describes a flexible end-effector for a robotic system. This end-effector is flexible because it has linear motion slides, allowing it to handle many different types of door assemblies. By maximizing handling flexibility, one end-effector (instead of multiple end-effectors) may be used to handle different styles of door assemblies, thereby saving time and cost during the manufacturing may different styles of vehicles and new models.

In certain embodiments, the flexible end-effector includes a frame and a clamp assembly movably coupled to the frame such that the clamp assembly is movable relative to the frame along a first direction. The clamp assembly includes a locator, a clamp movably coupled to the locator such that the clamp is movable between an open position and a closed position, and a pneumatic actuator coupled to the clamp to move the clamp between the open position and the closed position. The flexible end-effector also includes a linear motion slide coupled between the clamp assembly and the frame to allow the clamp assembly to move linearly relative to the frame along the first direction. Further, the flexible end-effector includes a servomotor assembly coupled to the linear motion slide to actuate the linear motion slide. The servomotor assembly includes a servomotor and a motor controller integrated with the servomotor. Upon actuation of the servomotor assembly, the linear motion slide linearly moves the clamp assembly relative to the frame along the first direction. The clamp is pivotally coupled to the locator. The clamp assembly is a first clamp assembly, the clamp is a first clamp, the locator is a first locator, the pneumatic actuator is a first pneumatic actuator, the linear motion slide is a first linear motions slide, the open position is a first open position, the closed position is a first closed position, the flexible end-effector further includes a second clamp assembly movably coupled to the frame, the second clamp assembly is spaced apart from the first clamp assembly along the first direction, the second clamp assembly includes a second locator and a second clamp pivotally coupled to the second locator such that the second clamp is pivotable between a second open position and a second closed position, the flexible end-effector further includes a second pneumatic actuator coupled to the second clamp to move the second clamp between the second open position and the second closed position, the flexible end-effector further includes a second linear motion slide coupled between the second clamp assembly and the frame to allow the second clamp assembly to move linearly relative to the frame along the first direction The flexible end-effector further includes a third clamp assembly spaced apart from the first clamp assembly along a second direction. The second direction is perpendicular to the first direction. The third clamp assembly is movably coupled to the frame. The third clamp assembly is spaced apart from the first clamp assembly along a second direction. The second direction is perpendicular to the first direction. The third clamp assembly includes a third locator and a third clamp pivotally coupled to the third locator such that the third clamp is pivotable between a third open position and a third closed position. The flexible end-effector further includes a third pneumatic actuator coupled to the third clamp to move the third clamp between the third open position and the third closed position. The flexible end-effector further includes a third linear motion slide coupled between the third clamp assembly and the frame to allow the third clamp assembly to move linearly relative to the frame along the second direction.

The flexible end-effector further includes a fourth clamp assembly spaced apart from the third clamp assembly along the first direction. The fourth clamp assembly is spaced apart from the second clamp assembly along the second direction. The fourth clamp assembly includes a fourth clamp assembly movably coupled to the frame, the fourth clamp assembly includes a fourth locator and a fourth clamp pivotally coupled to the fourth locator such that the fourth clamp is pivotable between a fourth open position and a third closed position. The flexible end-effector further includes a fourth pneumatic actuator coupled to the fourth clamp to move the third clamp between the fourth open position and the fourth closed position. The flexible end-effector further includes a fourth linear motion slide coupled between the fourth clamp assembly and the frame to allow the fourth clamp assembly to move linearly relative to the frame along the second direction.

The flexible end-effector further includes a fifth linear motion slide coupled between the third clamp assembly and the frame to allow the third clamp assembly to move linearly relative to the frame along a third direction. The third direction is perpendicular to the first direction. The third direction is perpendicular to the second direction. The flexible end-effector further includes a sixth linear motion slide coupled between the fourth clamp assembly and the frame to allow the fourth clamp assembly to move linearly relative to the frame along the third direction. The first clamp assembly is not spaced apart from the second clamp assembly along the third direction.

The flexible end-effector further includes a brake coupled between the servomotor and the linear motion slide. Upon actuation, the brake is configured to fix a position of the clamp assembly relative to the frame. The linear motion slide may be a crossed-roller slide.

The present disclosure describes a robotic system, which includes a robotic arm and a flexible end-effector coupled to the robotic arm. The flexible end-effector includes a frame and a clamp assembly movably coupled to the frame such that the clamp assembly is movable relative to the frame along a first direction. The clamp assembly includes a locator and a clamp movably coupled to the first locator such that the clamp is movable between an open position and a closed position. The clamp assembly further includes a pneumatic actuator coupled to the first clamp to move the clamp between the open position and the closed position. The flexible end-effector further includes a linear motion slide coupled between the clamp assembly and the frame to allow the clamp assembly to move linearly relative to the frame along the first direction. Further, the flexible end-effector includes a servomotor assembly coupled to the linear motion slide to actuate the linear motion slide, wherein the servomotor assembly includes a servomotor and a motor controller integrated with the servomotor. Upon actuation of the servomotor assembly, the linear motion slide linearly moves the clamp assembly relative to the frame along the first direction. The clamp is pivotally coupled to the locator.

The clamp assembly is a first clamp assembly, the clamp is a first clamp, the locator is a first locator, the pneumatic actuator is a first pneumatic actuator, the linear motion slide is a first linear motion slide, the open position is a first open position, and the closed position is a first closed position. The flexible end-effector further includes a second clamp assembly movably coupled to the frame. The second clamp assembly is spaced apart from the first clamp assembly along the first direction. The second clamp assembly includes a second locator and a second clamp pivotally coupled to the second locator such that the second clamp is pivotable between a second open position and a second closed position. The flexible end-effector further includes a second pneumatic actuator coupled to the second clamp to move the second clamp between the second open position and the second closed position. The flexible end-effector further includes a second linear motion slide coupled between the second clamp assembly and the frame to allow the second clamp assembly to move linearly relative to the frame along the first direction.

The robotic system further includes a third clamp assembly spaced apart from the first clamp assembly along a second direction. The second direction is perpendicular to the first direction. The third clamp assembly includes a third clamp assembly movably coupled to the frame. The third clamp assembly is spaced apart from the first clamp assembly along a second direction. The second direction is perpendicular to the first direction. The third clamp assembly includes a third locator and a third clamp pivotally coupled to the third locator such that the third clamp is pivotable between a third open position and a third closed position. The flexible end-effector further includes a third pneumatic actuator coupled to the third clamp to move the third clamp between the third open position and the third closed position. The flexible end-effector further includes a third linear motion slide coupled between the third clamp assembly and the frame to allow the third clamp assembly to move linearly relative to the frame along the second direction.

The robotic system further includes a fourth clamp assembly spaced apart from the third clamp assembly along the first direction. The fourth clamp assembly is spaced apart from the second clamp assembly along the second direction. The fourth clamp assembly includes a fourth clamp assembly movably coupled to the frame. The fourth clamp assembly includes a fourth locator and a fourth clamp pivotally coupled to the fourth locator such that the fourth clamp is pivotable between a fourth open position and a third closed position. The flexible end-effector further includes a fourth pneumatic actuator coupled to the fourth clamp to move the third clamp between the fourth open position and the fourth closed position. The flexible end-effector further includes a fourth linear motion slide coupled between the fourth clamp assembly and the frame to allow the fourth clamp assembly to move linearly relative to the frame along the first direction.

The robotic system further includes a fifth linear motion slide coupled between the third clamp assembly and the frame to allow the third clamp assembly to move linearly relative to the frame along a third direction. The third direction is perpendicular to the first direction. The third direction is perpendicular to the second direction.

The robotic system further includes a sixth linear motion slide coupled between the fourth clamp assembly and the frame to allow the fourth clamp assembly to move linearly relative to the frame along the third direction. The first clamp assembly is not spaced apart from the second clamp assembly along the third direction.

The robotic system further includes a brake coupled between the servomotor and the linear motion slide. Upon actuation, the brake is configured to fix a position of the clamp assembly relative to the frame. The linear motion slide may be a crossed-roller slide.

The above features and advantages and other features and advantages of the present disclosure are readily apparent from the following detailed description of the best modes for carrying out the disclosure when taken in connection with the accompanying drawings.

DETAILED DESCRIPTION

Figure 1:
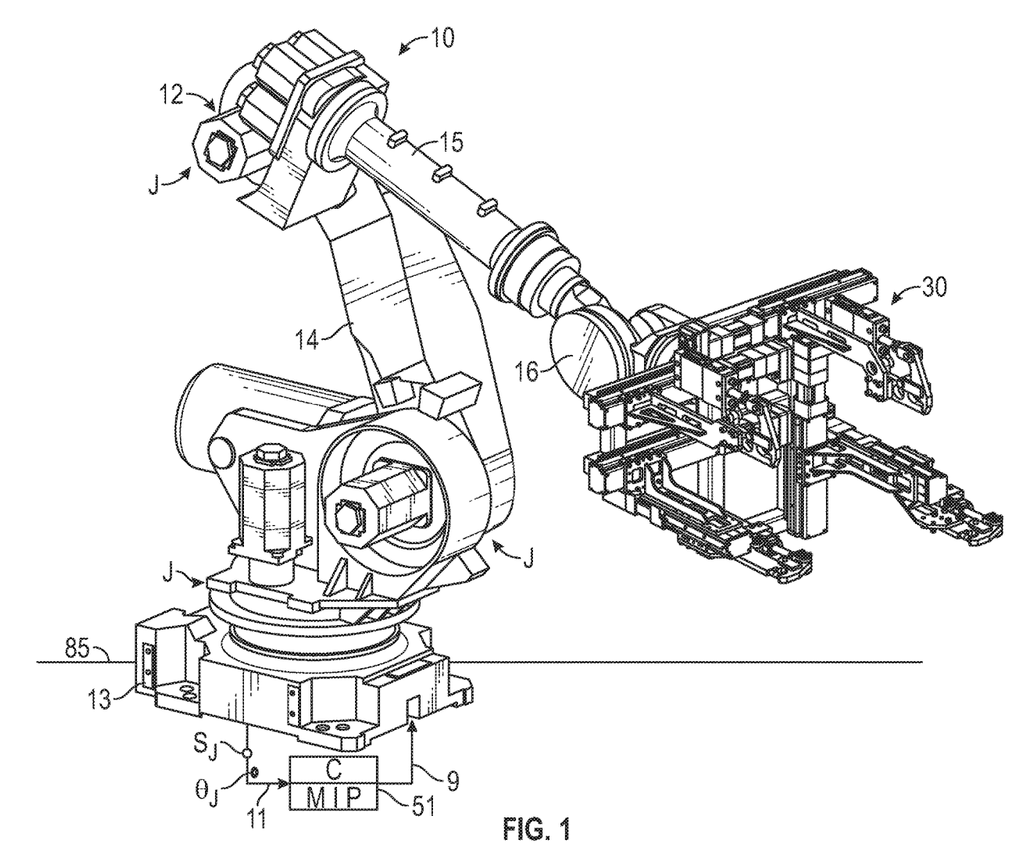
FIG. 1 is a schematic perspective view of a robotic system including a flexible end-effector.

Referring to the drawings, wherein like reference numbers refer to like components throughout the several Figures, a robotic system 10 is shown schematically in FIG. 1. The robotic system 10 includes a multi-axis industrial robot 12 and a flexible end-effector 30 described in detail below. Overall operational control of the robotic system 10 may be achieved via a main controller (C) 51.

With continued reference to FIG. 1, the main controller 51 may be configured as a host machine, e.g., a digital computer, which is specially programmed to execute steps or instructions. To that end, the main controller 51 includes sufficient hardware to perform the required method steps, i.e., with sufficient memory (M), a processor (P), and other associated hardware such as a high-speed clock, analog-to-digital and/or digital-to-analog circuitry, a timer, input/output circuitry and associated devices, signal conditioning and/or signal buffering circuitry. The memory (M) includes sufficient tangible, non-transitory memory such as magnetic or optical read-only memory, flash memory, etc., as well as random access memory, electrically erasable programmable read only memory, and the like. The main controller 51 receives and records the measured joint positions (arrow $\theta_J$) from the position sensors ($S_J$), and also monitors forces applied by or to the end-effector 30 in the course of configuring the end-effector 30 as well as while operating on a given work piece. The main controller 51 generates or receives input signals (arrow 11) informing the main controller 51 as to the required work tasks to perform and identifying the corresponding work pieces, and outputs control signals (arrow 9) to the robot 12 to command the required actions from the robot 12.

The robot 12 may be configured as a 6-axis industrial robot and may include a fixed or mobile base 13 and a plurality of robotic joints J, at least some of which are shown in FIG. 1. The base 13 may be fixed to a floor 85, a wall, or a column. The various joints J connect segments or serial linkages of the robot 12, including a first or lower robotic arm 14, a second or upper robotic arm 15, and a wrist 16, which collectively provide the desired range of motion and number of control degrees of freedom needed for performing assigned work tasks. It is contemplated that the robot 12 may include more or fewer robotic arms and wrists.

Examples of such work tasks include the grasping, lifting, locating, and placement of panels of metal or glass panes, along with a host of other possible tasks such as painting and welding. Joint position sensors $S_J$ may be positioned with respect to each joint J and configured to measure and report the measured joint positions (arrow $\theta_J$) to the main controller 51. Additionally, one or more force sensors (not shown) may also be positioned with respect to the joints J, e.g., the wrist 16, and used to provide force or torque feedback to the main controller 51, which may avoid excessive force on the work piece or the end-effector 30.

Figure 2:
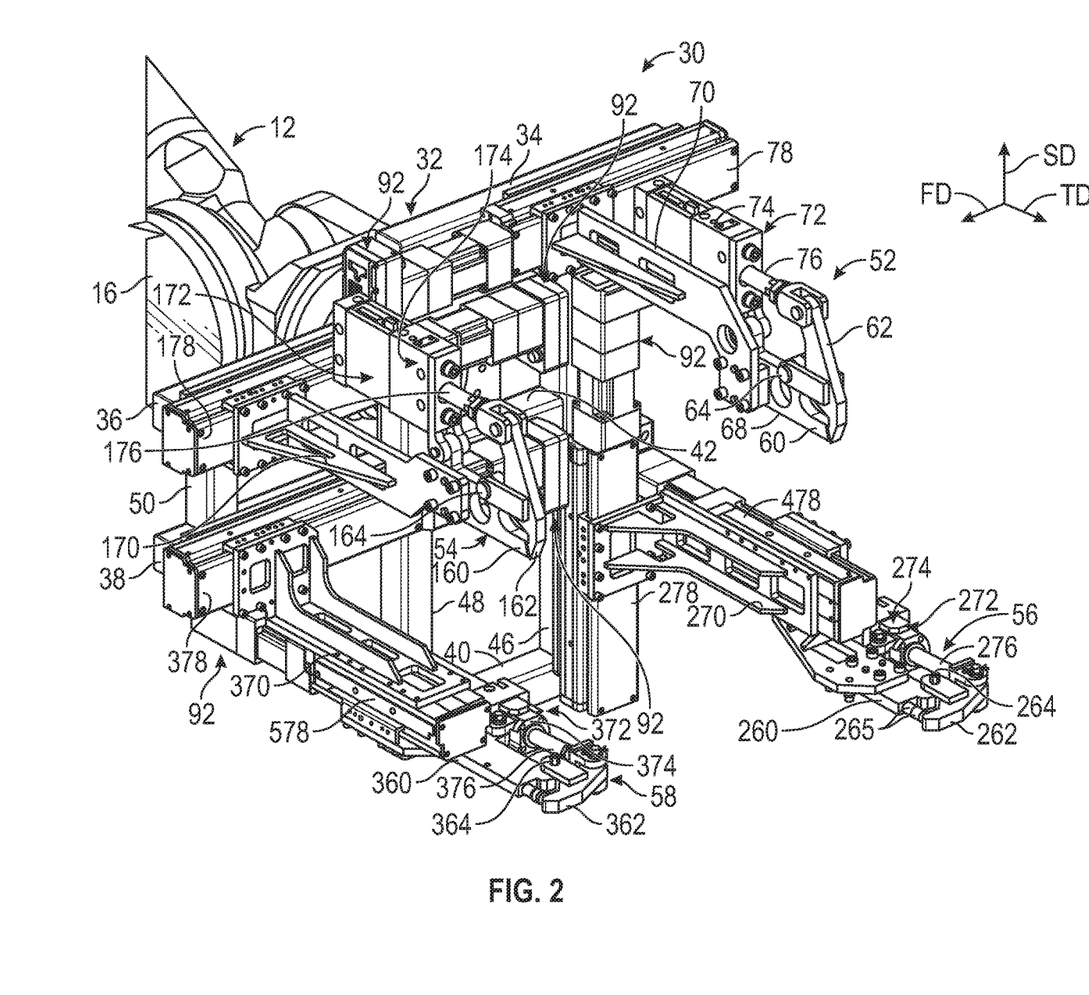
FIG. 2 is a schematic, perspective front view of the flexible end-effector shown in FIG. 1.
Figure 3:
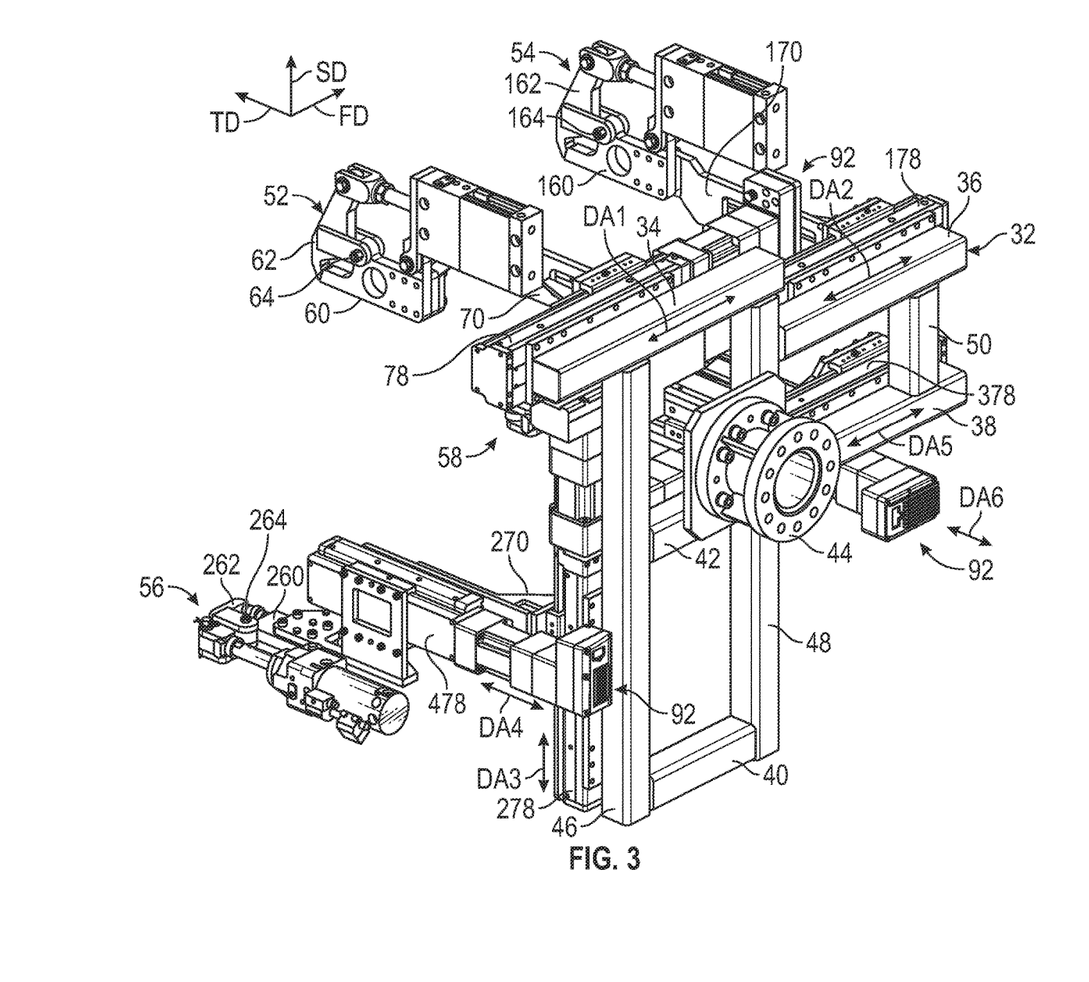
FIG. 3 is a schematic, perspective rear view of the flexible end-effector shown in FIG. 1.

With reference to FIGS. 2 and 3, the end-effector 30 includes a frame 32 coupled to the second robotic arm 15. The frame 32 includes a first beam 34 elongated along a first direction FD and a second beam 36 elongated along the first direction FD. The second beam 36 is spaced apart from the first beam 34 along a second direction SD, which is perpendicular to the first direction FD. Further, the second beam 36 is spaced apart from the first beam 34 along the first direction FD. The frame 32 further includes a third beam 38 elongated along the first direction FD and a fourth beam 40 elongated along the first direction FD. The fourth beam 40 is spaced apart from the third beam 38, the second beam 36, and the first beam 34 along the second direction SD. The frame 32 includes a fifth beam 42 elongated along the first direction FD. The fifth beam 42 is spaced apart from the first beam 34, the second beam 36, and the fourth beam 40 along the second direction. However, the fifth beam 42 is aligned with the third beam 38, such that the fifth beam 42 is not spaced apart from the third beam 38 along the second direction SD. A coupling 44, such as a flange, may be directly connected to the fifth beam 42 to directly couple the frame 32 to the second robotic arm 15. The frame 32 further includes a first column 46 elongated along the second direction D, a second column 48 elongated along the second direction SD, and a third column 50 elongated along the second direction SD. The first column 46 is spaced apart from the second column 48 and the third column 50 along the first direction FD. The first column 46 is directly coupled to the first beam 34, the fourth beam 40, and the fifth beam 42 to enhance the structural integrity of the frame 32. The second column 48 is directly coupled to the first beam 34, the fourth beam 40, and the fifth beam 42 to enhance the structural integrity of the frame 32. The third column 50 is directly coupled to the second beam 36 and the third beam 38 to enhance the structural integrity of the frame 32.

With continued reference to FIGS. 2 and 3, the end-effector 30 further includes a first clamp assembly 52, a second clamp assembly 54, a third clamp assembly 56, and a fourth clamp assembly 58 each movably coupled to the frame 32. The first clamp assembly 52 is movably coupled to the frame 32 along the first direction FD as illustrated by double arrows DA1. The second clamp assembly 54 is movably coupled to the frame 32 along the first direction FD as illustrated by double arrows DA2. The third clamp assembly 56 is movably coupled to the frame 32 along the second direction SD (as illustrated by double arrows DA3) and a third direction TD (as illustrated by double arrows DA4). The third direction TD is perpendicular to the first direction FD and the second direction SD. The fourth clamp assembly 58 is movable relative to the frame 32 along the first direction FD (as illustrated by double arrows DA5) and the third direction TD (as illustrated by double arrows DA6). In the depicted embodiment, the first clamp assembly 52 is not movable relative to the frame 32 along the second direction SD and/or the third direction TD. In the depicted embodiment, the second clamp assembly 54 is not movable relative to the frame 32 along the second direction SD and/or the third direction TD. In the depicted embodiment, the third clamp assembly 56 is not movable along the first direction FD. In the depicted embodiment, the fourth clamp assembly 58 is not movable along the second direction SD. The first clamp assembly 52 is not spaced apart from the second clamp assembly 54 along the third direction TD to minimize part count.

Figure 4:
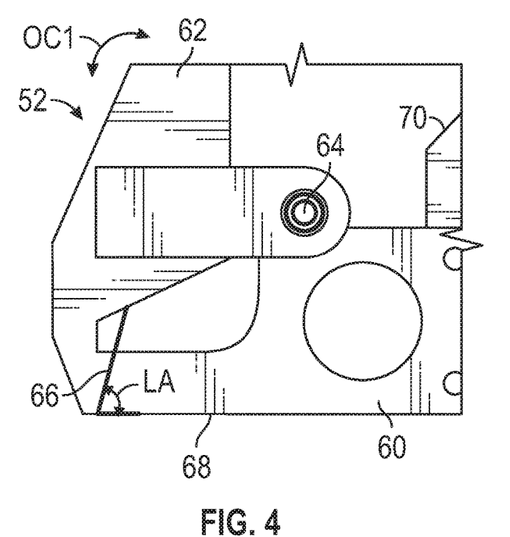
FIG. 4 is a schematic, plan side view of a first clamp assembly or a second clamp assembly of the end effector shown in FIG. 1.
Figure 5A:
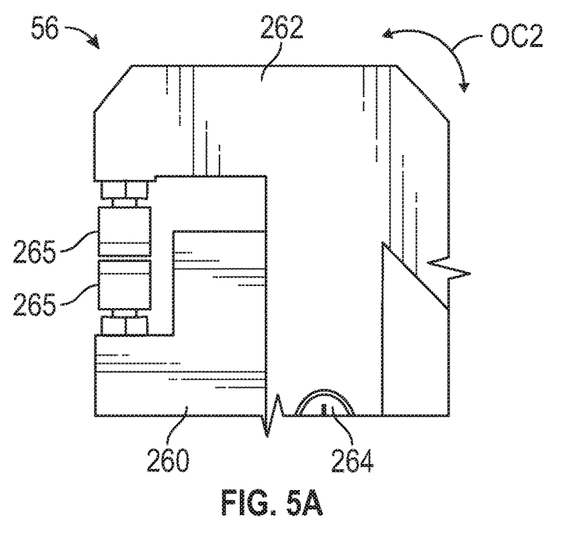
FIG. 5A is a schematic, plan view of a third clamp assembly or a fourth clamp assembly of the end effector shown in FIG. 1.
Figure 5B:
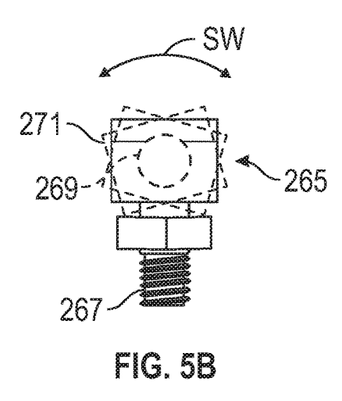
FIG. 5B is a schematic, perspective view of swivel tips of a clamp assembly.

With reference to FIGS. 2, 3 and 4, the first clamp assembly 52 is identical to the second clamp assembly 54. Thus, in the interest of brevity, solely the first clamp assembly 52 is described in detail below. The first clamp assembly 52 includes a first locator 60 and a first clamp 62 movably coupled to the first locator 60. As such, the first clamp 62 can move relative to the first locator 60 between an open position and a closed position as indicated by double arrows OC1. In the depicted embodiment, a first pivot pin 64 pivotally couples the first clamp 62 to the first locator 60. Therefore, the first clamp 62 can pivot relative to the first locator 60 about the first pivot pin 64. The first locator 60 includes a locating wall 66 for locating a workpiece and a base wall 68 directly connected to the locating wall 66. To facilitate locating the workpiece, the locating wall 66 is obliquely angled relative to the base wall 68. The locating wall 66 defines a locating angle LA relative to the base wall 68. As a non-limiting example, the locating angle LA may be 75.2 degrees. The first clamping assembly 52 further includes a first support 70 coupled between the frame 32 and the first locator 60. The first clamping assembly 52 further includes a first pneumatic actuator 72 directly coupled to the first clamp 62 to move the first clamp 62 between the open position and the closed position. In the depicted embodiment, the first pneumatic actuator 72 includes a first actuator housing 74 and a first rod 76 movably coupled to the first actuator housing 74. The first rod 76 can move linearly relative to the first actuator housing 74 between a retracted position and an extended position. Because the first rod 76 is directly coupled to the first clamp 62, moving the first rod 76 causes the first clamp 62 to move between the open position and the closed position. As discussed above, the second clamp assembly 54 is identical to the first clamp assembly 52 and therefore includes a second locator 160, a second clamp 162 movably coupled to the second locator 160, a second pivot pin 164, and a second support 170. Similarly, the second clamping assembly 54 also includes a second pneumatic actuator 172 having a second actuator housing 174 and a second rod 176 movably coupled to the second actuator housing 174.

With reference to FIGS. 2, 3, 5A, 5B, and 6, the third clamp assembly 56 is identical to the fourth clamp assembly 58. Thus, in the interest of brevity, solely the third clamp assembly 56 is described in detail below. The third clamp assembly 56 includes a third locator 260 and a third clamp 262 movably coupled to the third locator 260. As such, the third clamp 262 can move relative to the third locator 260 between an open position and a closed position as indicated by double arrows OC2. In the depicted embodiment, a third pivot pin 264 pivotally couples the third clamp 262 to the third locator 260. Therefore, the third clamp 262 can pivot relative to the third locator 260 about the third pivot pin 264. Each of the third clamp 262 and the third locator 260 includes a swivel tip 265 to facilitate clamping a workpiece. Each swivel tip 265 includes a shank 267, a ball 269 coupled to the shank 267, and a block 271 coupled to the ball 269. The block 271 can swivel relative to the ball 269 in the direction indicated by double arrow SW. As a non-limiting example, the block 271 can swivel ±12 degrees relative to the ball 269. The third clamping assembly 56 further includes a third support 270 coupled between the frame 32 and the third locator 260. The third clamping assembly 56 further includes a third pneumatic actuator 272 directly coupled to the third clamp 262 to move the third clamp 262 between the open position and the closed position. In the depicted embodiment, the third pneumatic actuator 272 includes a third actuator housing 274 and a third rod 276 movably coupled to the third actuator housing 274. The third rod 276 can move linearly relative to the third actuator housing 274 between a retracted position and an extended position. Because the third rod 276 is directly coupled to the third clamp 262, moving the third rod 276 causes the third clamp 262 to move between the open position and the closed position. As discussed above, the fourth clamp assembly 58 is identical to the third clamp assembly 56 and therefore includes a fourth locator 360, a fourth clamp 362 movably coupled to the fourth locator 360, a fourth pivot pin 364, and a fourth support 370. Similarly, the fourth clamping assembly 58 also includes a fourth pneumatic actuator 372 having a fourth actuator housing 374 and a fourth rod 376 movably coupled to the fourth actuator housing 374.

The end-effector 30 further includes a first linear motion slide 78, a second linear motion slide 178, a third linear motion slide 278, a fourth linear motion slide 378, a fifth linear motion slide 478, and a sixth linear motion slide 578 for linearly moving the first clamp assembly 52, the second clamp assembly 54, the third clamp assembly 56, and the fourth clamp assembly 58 relative to the frame 32. The first linear motion slide 78 is coupled between the first clamp assembly 52 and the frame 32 to allow the first clamp assembly 52 to move linearly relative to the frame 32 along the first direction FD. For instance, the first linear motion slide 78 may be directly coupled to the first beam 34 to facilitate the linear motion of the first clamp assembly 52 relative to the frame 32. The second linear motion slide 178 is coupled between the second clamp assembly 54 and the frame 32 to allow the second clamp assembly 54 to move linearly relative to the frame 32 along the first direction FD. For instance, the second linear motion slide 178 may be directly coupled to the second beam 36 to facilitate the linear motion of the second clamp assembly 54 relative to the frame 32. The third linear motion slide 278 is coupled between the third clamp assembly 56 and the frame 32 to allow the third clamp assembly 56 to move linearly relative to the frame 32 along the second direction SD. For instance, the third linear motion slide 278 may be directly coupled to the first column 46 to facilitate the linear motion of the third clamp assembly 56 relative to the frame 32. The fourth linear motion slide 378 is coupled between the fourth clamp assembly 58 and the frame 32 to allow the fourth clamp assembly 58 to move linearly relative to the frame 32 along the first direction FD. For instance, the fourth linear motion slide 378 may be directly coupled to the third beam 38 to facilitate the linear motion of the fourth clamp assembly 58 relative to the frame 32. The fifth linear motion slide 478 is coupled between the third clamp assembly 56 and the frame 32 to allow the third clamp assembly 56 to move linearly relative to the frame 32 along the third direction TD. For instance, the fifth linear motion slide 478 may be directly coupled to the third support 270 to facilitate the linear motion of the third clamp assembly 56 relative to the frame 32 along the third direction TD. The sixth linear motion slide 578 is coupled between the fourth clamp assembly 58 and the frame 32 to allow the fourth clamp assembly 58 to move linearly relative to the frame 32 along the third direction TD. For instance, the sixth linear motion slide 578 may be directly coupled to the fourth support 370 to facilitate the linear motion of the fourth clamp assembly 58 relative to the frame 32 along the third direction TD.

The first linear motion slide 78, the second linear motion slide 178, the third linear motion slide 278, the fourth linear motion slide 378, the fifth linear motion slide 478, and the sixth linear motion slide 578 are identical to each other, but may be placed at different location and orientations relative to the frame 32. Thus, in the interest of brevity, solely the first linear motion slide 78 is described in detail below.

Figure 6:
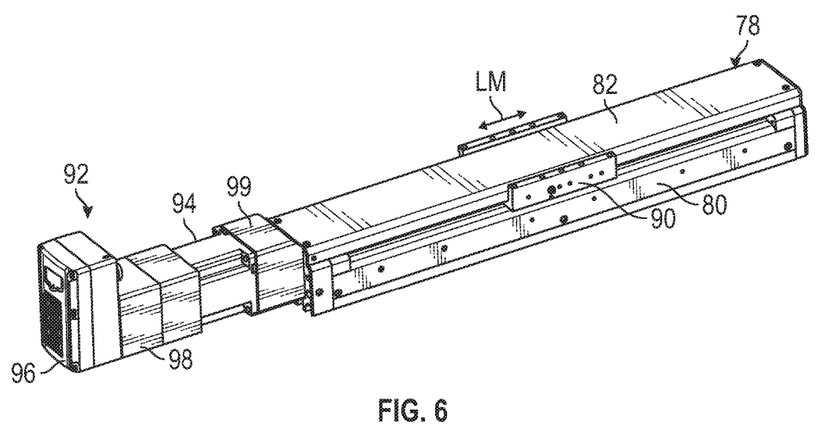
FIG. 6 is a schematic, perspective view of a linear motion slide coupled to a slide controller, an encoder, a brake, and a servomotor.
Figure 7:
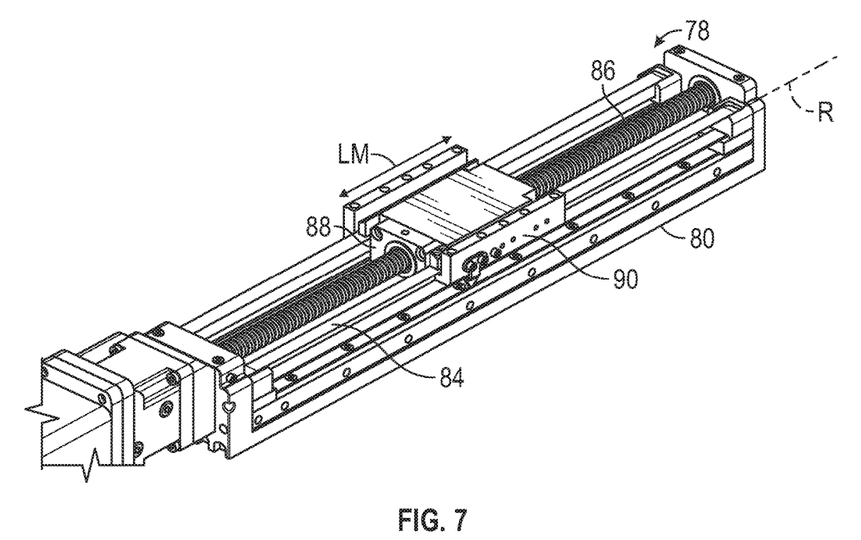
FIG. 7 is a schematic, perspective view of the linear motion slide shown in FIG. 6 without the cover.
Figure 8:
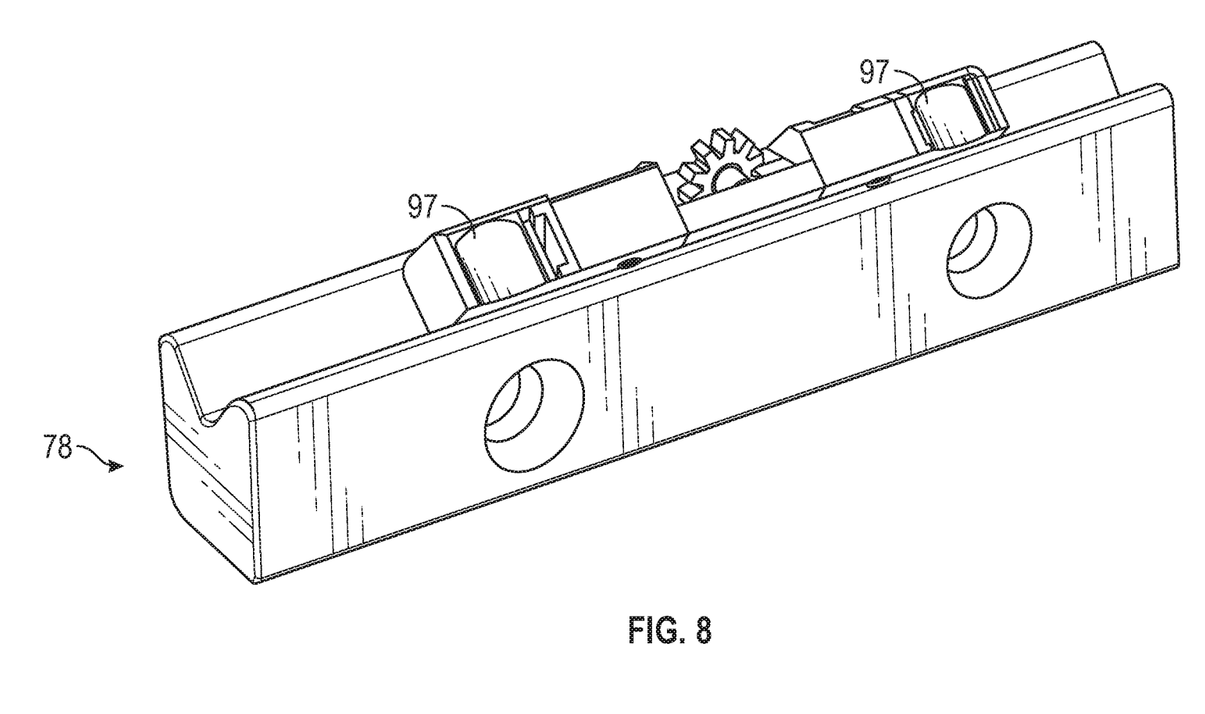
FIG. 8 is a schematic, perspective view of a portion of a crossed roller slide.

With reference to FIG. 6, the first linear motion slide 78 (and all the other linear motion sides mentioned herein) may include a slide housing 80, a cover 82 covering an inner cavity 84 of the slide housing 80, and a screw 86 inside the inner cavity of the slide housing 80. The screw 86 can rotate about a rational axis R. The first linear motion slide 78 also includes a nut 88 threadedly engaged to the screw 86. As such, upon rotation of the screw 86 about the rotational axis R, the nut 88 moves linearly along the rotational axis R in the direction indicated by double arrows LM. The first linear motion slide 78 includes a slider 90 directly coupled to the nut 88 that moves linearly in unison with the nut 88. The slider 90 is at least partially disposed outside the slide housing 80 and is directly or indirectly coupled to the first clamp assembly 52, thereby allowing the first clamp assembly 52 to move linearly in unison with the slider 90. The first linear motion slide 78 is coupled to a servomotor assembly 92 coupled to actuate the first linear motion slide 78. All other linear motion slides are coupled to a corresponding servomotor assembly 92. The servomotor assembly 92 includes a servomotor 94 and a motor controller 96 integrated with the servomotor 94. The motor controller 96 can control the operation of the servomotor 94. The servomotor assembly 92 further includes a motor encoder 98 coupled to the motor controller 96 and the servomotor 94. The motor encoder 98 can convert the angular position or motion of the shaft of the servomotor 94 to analog or digital signals that can be transmitted to the motor controller 96. The motor controller 96 can use the signals received by the motor encoder 98 to control the servomotor 94. The servomotor 94 is coupled to the screw 86 and can therefore drive the rotation of the screw 86. Accordingly, upon actuation of the servomotor assembly 92, the first linear motion slide 78 linearly moves the first clamp assembly 52 relative to the frame 32 along the first direction FD. The servomotor assembly 92 further includes a brake 99 coupled between the servomotor 94 and the first linear motion slide 78. Upon actuation, the brake 99 can fix the position of the first linear motion slide 78, thereby fixing the position of the first clamp assembly 52 relative to the frame 32. As shown in FIG. 8, the first linear motion slide 78 may be cross-roller slide having crossed roller bearings 97.

Figure 9:
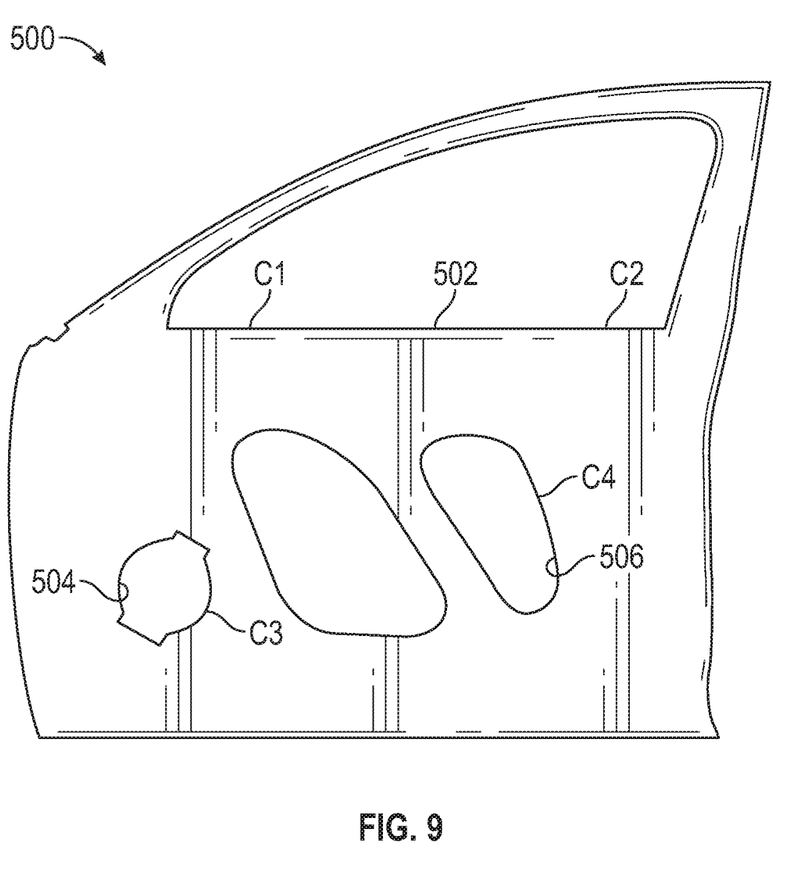
FIG. 9 is a schematic, front view of a vehicle door.

With reference to FIGS. 2 and 9, the end-effector 30 can be used to grasp a vehicle door 500. The vehicle door 500 includes an inner belt 502, a speaker mounting hole 504, and a door latch mounting hole 506. The first clamp assembly 52 can clamp the inner belt 502 of the vehicle door 500 at or near a first clamp location C1. The second clamp assembly 54 can clamp the inner belt 502 at or near a second clamp location C2. The third clamp assembly 56 can clamp the vehicle door 500 around the speaker mounting hole 504 at or near a third clamp location C3. The fourth clamp assembly 58 can clamp the vehicle door 500 around the door latch mounting hole 506 at or near a fourth clamping location C4.

While the best modes for carrying out the disclosure have been described in detail, those familiar with the art to which this disclosure relates will recognize various alternative designs and embodiments for practicing the disclosure within the scope of the appended claims.

What is claimed is:

1. A flexible end-effector for a robotic system, comprising:
   a frame including a first beam elongated along a first direction, a second beam elongated along the first direction, a third beam elongated along the first direction, a fourth beam elongated along the first direction, a fifth beam elongated along the first direction, a first column elongated along a second direction, the first column is directly coupled to the first beam, the fourth beam, and the fifth beam, and the second direction is perpendicular to the first direction;
   a first clamp assembly movably coupled to the frame such that the first clamp assembly is movable relative to the frame along the first direction, wherein the first clamp assembly includes a first locator, a first clamp movably coupled to the first locator, and a first linear motion slide coupled between the first clamp assembly and the frame, the first linear motion slide is directly coupled to the first beam, the first locator includes a locating wall and a base wall directly connected to the locating wall, the locating wall is obliquely angled relative to the base wall;
   a servomotor assembly coupled to the first linear motion slide, wherein the servomotor assembly includes a servomotor, a brake coupled between the servomotor and the first linear motion slide, a motor controller integrated with the servomotor, and a motor encoder coupled between the motor controller and the servomotor such that motor controller is configured to receive signals from the motor encoder that are indicative of an angular position of the servomotor, and the motor controller is configured to use the signals from the motor encoder to control the servomotor;
   a second clamp assembly including a second linear motion slide directly coupled to the second beam;
   a third clamp assembly including a third linear motion slide directly coupled to the first column, the third clamp assembly includes a swivel tip, the swivel tip includes a shank, a ball coupled to the shank, and a block coupled to the ball such that the block is configured to swivel relative to the ball, and the ball is entirely disposed inside the block;
   a fourth clamp assembly including a fourth linear motion slide directly coupled to the third beam;
   a fifth linear motion slide coupled between the third clamp assembly and the frame to allow the third clamp assembly to move linearly relative to the frame along a third direction, wherein the third direction is perpendicular to the first direction and the second direction; and
   a sixth linear motion slide coupled between the fourth clamp assembly and the frame to allow the fourth clamp assembly to move linearly relative to the frame along the third direction.

2. The flexible end-effector of claim 1, wherein the first clamp is pivotally coupled to the first locator such that the first clamp is movable between a first open position and a first closed position.

3. The flexible end-effector of claim 2, wherein the second clamp assembly is spaced apart from the first clamp assembly along the first direction, the second clamp assembly includes a second locator and a second clamp pivotally coupled to the second locator such that the second clamp is pivotable between a second open position and a second closed position, and the flexible end-effector further includes a second pneumatic actuator coupled to the second clamp to move the second clamp between the second open position and the second closed position.

4. The flexible end-effector of claim 3, wherein the third clamp assembly is spaced apart from the first clamp assembly along the second direction, the third clamp assembly includes a third clamp assembly movably coupled to the frame the third clamp assembly includes a third locator and a third clamp pivotally coupled to the third locator such that the third clamp is pivotable between a third open position and a third closed position, and the flexible end-effector further includes a third pneumatic actuator coupled to the third clamp to move the third clamp between the third open position and the third closed position.

5. The flexible end-effector of claim 4, wherein the fourth clamp assembly is spaced apart from the third clamp assembly along the first direction, wherein the fourth clamp assembly is spaced apart from the second clamp assembly along the second direction, the fourth clamp assembly is movably coupled to the frame, the fourth clamp assembly includes a fourth locator and a fourth clamp pivotally coupled to the fourth locator such that the fourth clamp is pivotable between a fourth open position and a fourth closed position, and the flexible end-effector further includes a fourth pneumatic actuator coupled to the fourth clamp to move the third clamp relative to the frame.

6. The flexible end-effector of claim 5, wherein the first clamp assembly is not spaced apart from the second clamp assembly along the third direction.

7. The flexible end-effector of claim 1, wherein, upon actuation, the brake is configured to fix a position of the first clamp assembly relative to the frame.

8. The flexible end-effector of claim 1, wherein the first linear motion slide is a crossed-roller slide.

* * * * *